(12) United States Patent
Hauser et al.

(10) Patent No.: US 8,849,233 B2
(45) Date of Patent: Sep. 30, 2014

(54) SYSTEM AND METHOD FOR APPLICATIONS ON MOBILE COMMUNICATIONS DEVICES

(75) Inventors: Robert R. Hauser, Frisco, TX (US);
Thomas T. Wheeler, Frisco, TX (US);
Robert W. Peterson, Plano, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 0 days.

(21) Appl. No.: 12/945,513

(22) Filed: Nov. 12, 2010

(65) Prior Publication Data

US 2011/0136461 A1     Jun. 9, 2011

Related U.S. Application Data

(63) Continuation of application No. 12/629,923, filed on Dec. 3, 2009, now Pat. No. 8,644,854.

(51) Int. Cl.
*H04B 1/16* (2006.01)
*H04M 1/725* (2006.01)

(52) U.S. Cl.
CPC ........ *H04M 1/7253* (2013.01); *H04M 1/72527* (2013.01); *H04M 2250/02* (2013.01)
USPC ....... 455/334; 455/41.1; 455/41.2; 455/414.1

(58) Field of Classification Search
CPC ......... H04W 4/02; H04W 4/025; H04W 4/14; H04W 64/00; H04W 4/027; H04M 1/72527; H04M 1/7253; H04M 2250/02
USPC ........ 455/334, 404.2, 415, 427, 456.1, 456.2, 455/456.3, 456.6, 457, 466, 41.1, 41.2
See application file for complete search history.

(56) References Cited

U.S. PATENT DOCUMENTS

| 6,768,450 B1 | 7/2004 | Walters |
| 7,047,022 B2 | 5/2006 | Aoyama |
| 2002/0045455 A1 | 4/2002 | Spratt |

(Continued)

FOREIGN PATENT DOCUMENTS

| CN | 1344472 | 9/2001 |
| GB | 2348083 | 9/2009 |

(Continued)

OTHER PUBLICATIONS

European Patent Office, International Search Authority; PCTUS/2010/055637; International Search Report and Written Opinion; Feb. 28, 2011; 10 pages.

(Continued)

*Primary Examiner* — Dinh P Nguyen
(74) *Attorney, Agent, or Firm* — Stolowitz Ford Cowger LLP

(57) ABSTRACT

The functionality of smartphone applications may be extended to a basic phone, i.e., a phone lacking a particular smartphone capability, by providing a data synthesizer in the basic phone that synthesizers required data points. The data synthesizer may communicate with nearby smartphones to collect relevant data points such as location or motion data. Data points for the basic phone may be calculated from the collected data points. When an application on the basic phone requests data, a data provider proxy may retrieve a synthesized data point from the data synthesizer. In one example, a basic phone without a GPS or similar location module may execute a mapping application by averaging location data from nearby smartphones.

21 Claims, 10 Drawing Sheets

(56) References Cited

U.S. PATENT DOCUMENTS

| | | | |
|---|---|---|---|
| 2002/0184317 | A1 | 12/2002 | Thankachan |
| 2003/0151506 | A1* | 8/2003 | Luccketti ................ 340/539.13 |
| 2003/0197788 | A1 | 10/2003 | Parulski |
| 2004/0049343 | A1 | 3/2004 | Yamadaji et al. |
| 2004/0192269 | A1* | 9/2004 | Hill .......................... 455/414.1 |
| 2004/0243298 | A1 | 12/2004 | Knuuttila |
| 2005/0186965 | A1 | 8/2005 | Pagonis et al. |
| 2006/0046749 | A1 | 3/2006 | Pomerantz et al. |
| 2007/0195783 | A1* | 8/2007 | Faucher .................... 370/395.2 |
| 2007/0241888 | A1 | 10/2007 | Mantovani et al. |
| 2008/0037487 | A1 | 2/2008 | Li |
| 2008/0051102 | A1 | 2/2008 | Matsubara |
| 2008/0167796 | A1* | 7/2008 | Narayanaswami .......... 701/200 |
| 2009/0219901 | A1 | 9/2009 | Bull et al. |
| 2009/0248820 | A1 | 10/2009 | Basir |
| 2010/0151853 | A1* | 6/2010 | Pomerantz et al. .......... 455/427 |
| 2010/0318535 | A1* | 12/2010 | Weber et al. ................. 707/759 |
| 2011/0136507 | A1 | 6/2011 | Hauser |

FOREIGN PATENT DOCUMENTS

| | | |
|---|---|---|
| JP | 2000102060 | 7/2000 |
| JP | 2002152798 | 5/2002 |
| JP | 2004502942 | 1/2004 |
| JP | 2005530427 | 10/2005 |
| JP | 2007218614 | 8/2007 |
| JP | 2011518452 | 6/2011 |
| KR | 20070031378 | 3/2007 |
| WO | 0057657 | 9/2000 |
| WO | 2005121959 | 12/2005 |
| WO | 2009106919 | 9/2009 |
| WO | 2011068625 | 6/2011 |

OTHER PUBLICATIONS

Stolowitz Ford Cowger LLP; Related Case Listing; Nov. 16, 2011; 1 page.

English Abstract of JP 2000-102060; Patent Abstracts of Japan; Jul. 4, 2000; 1 page.

European Patent Office; IB International Preliminary Report on Patentability and Written Opinion of the ISA, PCT/US2010/055637; Jun. 14, 2012; 7 Pages.

English Abstract of JP 2007-218614; Patent Abstracts of Japan; Aug. 30, 2007; 1 page.

English Abstract JP national phase 2005-530427 of WO2003/107708, published Dec. 24, 2003; Bibliographic page; 1 Page.

English Abstract JP national phase 2004-502942 of WO2002/003093, published Oct. 1, 2002; Bibliographic page; 1 Page.

* cited by examiner

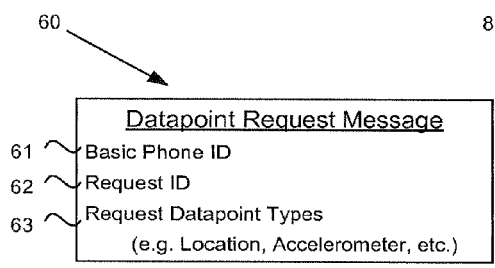
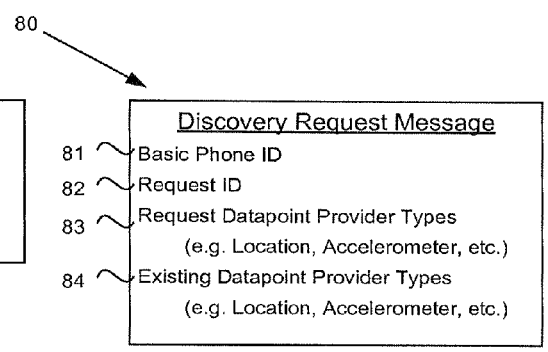
Figure 6
Figure 8
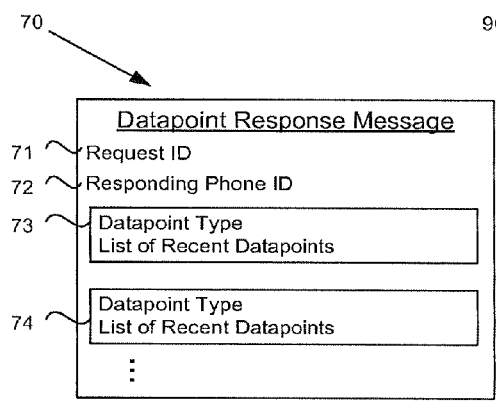
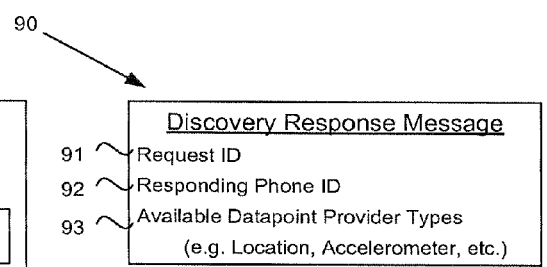
Figure 7
Figure 9

SYSTEM AND METHOD FOR APPLICATIONS ON MOBILE COMMUNICATIONS DEVICES

RELATED PATENT APPLICATIONS

This application is a continuation of and claims priority benefit to pending U.S. patent application Ser. No. 12/629,923, filed Dec. 3, 2009, all of which is incorporated herein in its entirety.

FIELD OF THE INVENTION

This disclosure relates to applications for mobile communications devices, in particular, applications that use data from data sensors, including but not limited to location data sensors.

BACKGROUND OF THE INVENTION

Modern mobile phones are often provided with various enhanced data applications that rely on enhanced data sensors within the mobile phone. Such enhanced data may include location information (e.g., from a Global Positioning System (GPS)), accelerometer data, and other types of data that allow the mobile phone, often termed a smart phone, to execute various smart applications, such as a mapping application. Smartphones are becoming increasingly popular. By contrast, basic phones and feature phones lack many smartphone capabilities and cannot participate in, nor can their users benefit from, many advanced applications.

A typical industry solution to this problem is to wait for device replacement, with current turnover rates being approximately 18 months, and hope for increased adoption of smartphones with needed capabilities. An alternative solution is to add external hardware for the sensor/capability, such as a Bluetooth GPS device, an external accelerometer, etc.

What is required is improved applications, devices and methods for providing enhanced applications to a greater number of mobile communications devices.

SUMMARY OF THE INVENTION

In one aspect of the disclosure, there is provided a method for executing an application in a basic mobile communications device. The method comprises generating a data request, transmitting the data request to at least one enhanced mobile communications device, receiving data from the at least one enhanced mobile communications device, and processing the data in at least one application of the basic mobile communications device.

In one aspect of the disclosure, there is provided a basic mobile communications device comprising at least one application and at least one data synthesizer. The data synthesizer may be configured to request data from at least one enhanced mobile communications device, receive data from the at least one enhanced mobile communications device, generate at least one datapoint from the received data, and provide the at least one datapoint to the application.

In one aspect of the disclosure, there is provided an enhanced mobile communications device comprising at least one data sensor and a data provider. The data provider may be configured to receive a data request from a basic mobile communications device and provide data from the at least one data sensor to the basic mobile communications device.

BRIEF DESCRIPTION OF THE DRAWINGS

Reference will now be made, by way of example only, to specific embodiments and to the accompanying drawings in which:

FIG. 6 shows an example form of a datapoint request message;

FIG. 7 shows an example form of a datapoint response message;

FIG. 8 shows an example form of a discovery request message;

FIG. 9 shows an example form of a discovery response message;

DETAILED DESCRIPTION OF THE INVENTION

A smartphone may have sensor data that another nearby basic phone does not have. The terms "smartphone" (or enhanced device) and "basic phone" (or basic device) are used to represent this situation. That is, a basic phone lacks some capability (enhanced capability) or sensor data (enhanced data) that is available on other nearby phones (smartphones) but it should be understood that any participating device may be considered to be a smartphone in the common description of the device.

Figure 1:
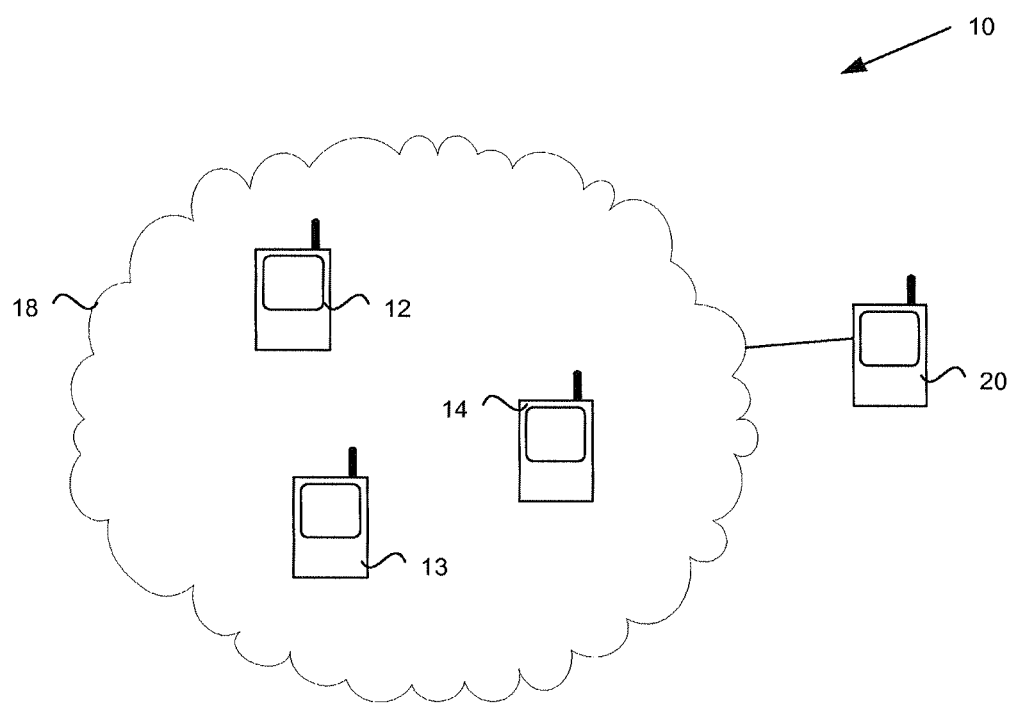
FIG. 1 shows a basic phone in proximity to a plurality of smart phones.

In FIG. 1, there is shown a system 10 having a group 18 of smartphones 12, 13, 14 that each have an enhanced capability compared to a basic phone 20. The basic phone 20 may be configured so that it can communicate directly with the smartphones 12, 13, 14, e.g., over Bluetooth, WiFi, ad hoc WiFi, WiFi Direct, or some similar short range protocol. Embodiments of the present disclosure describe how basic phones 20 can get a variety of data (e.g., GPS) from nearby smartphones and infer or synthesize their own data based on statistical aggregate data received from nearby smartphones.

Figure 2:
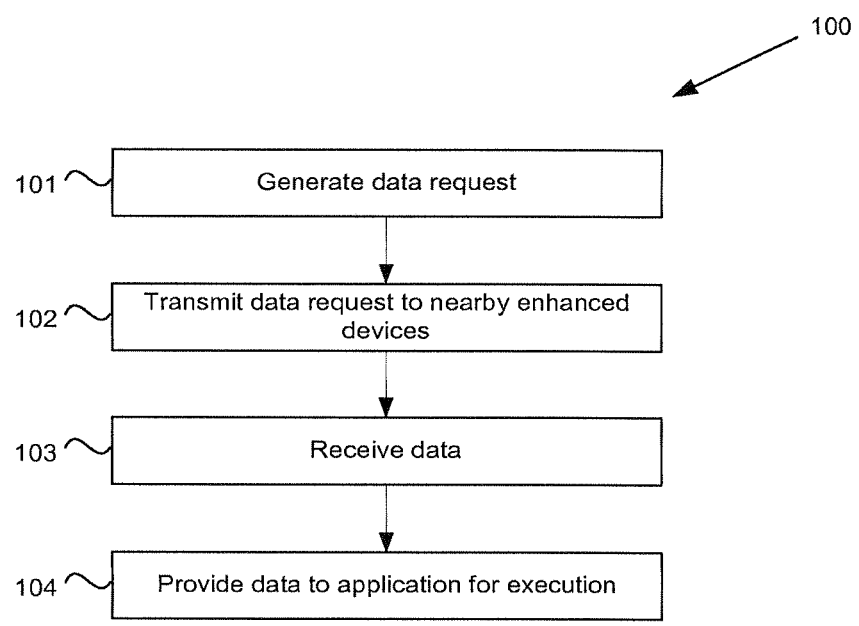
FIG. 2 shows a method for executing an application on a basic phone.

In one method according to the present disclosure and illustrated in the flowchart 100 of FIG. 2, at step 101 a data request is generated and transmitted to one or more nearby enhanced mobile communications devices (step 102) using the short range protocol. Data is received from the enhanced devices (step 103) and provided to the application for processing (step 104).

Figure 3:
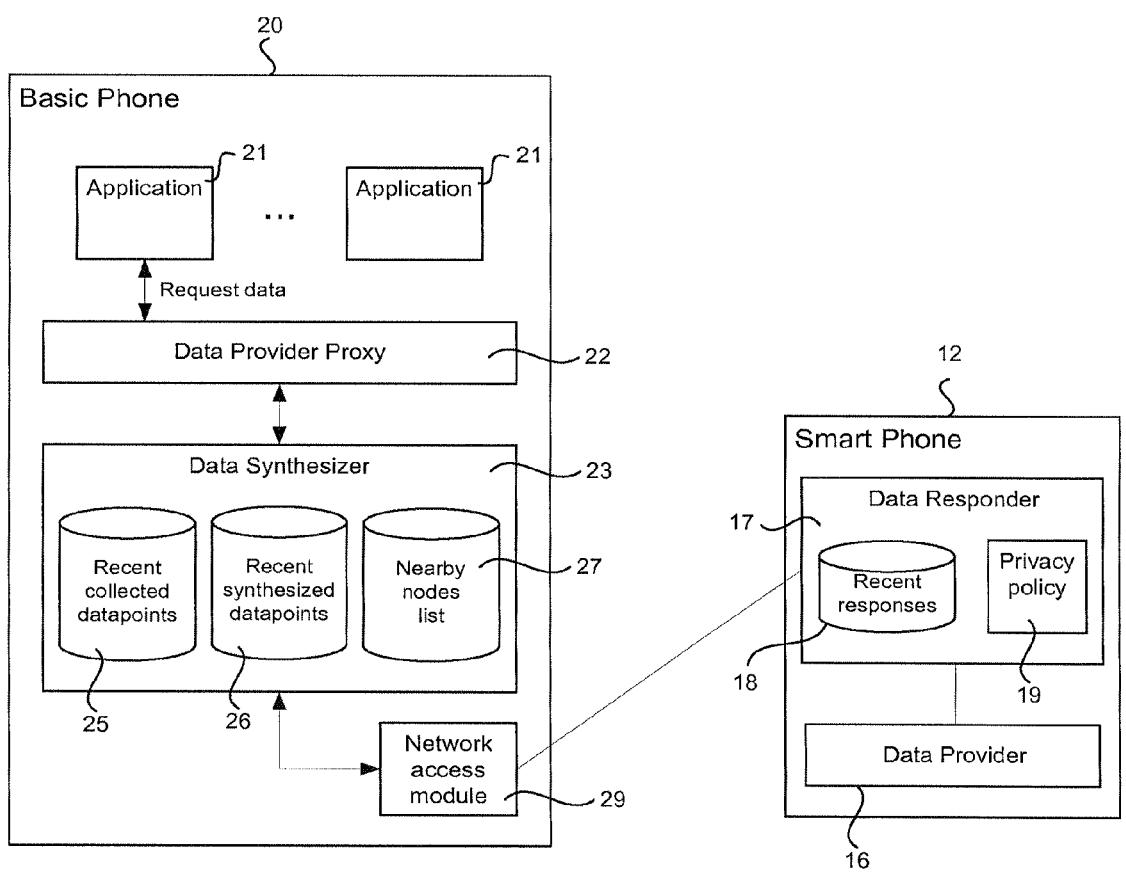
FIG. 3 shows components of a basic phone and components of a smart phone.

In one embodiment illustrated in FIG. 3, a basic phone 20 may be configured with any number of enhanced services applications 21. The applications 21 may request enhanced services data via a data provider proxy 22. The data provider proxy 22 retrieves the requested data from a data synthesizer 23 which includes data repositories including a recent collected datapoints repository 25, recent synthesized datapoints repository 26 and a nearby nodes list repository 27. These repositories 25, 26, 27 may be local memory or a persistent storage, e.g., a database.

As will be described in more detail below, the data synthesizer 23 receives or generates datapoints for the applications 21 from data received from nearby enhanced services phones, termed smartphones herein, which it communicates with via a network access module 29. One such smartphone 12 is shown in FIG. 3, though any number of smartphones may be considered to be nearby to the basic phone 20. The smartphone 12 includes a data provider 16 that is used to provide enhanced data for applications (not shown) that execute on the smartphone. The data provider 16 may incorporate one or more sensors for recording local environment data. Examples of sensors may include a location sensor (e.g., a GPS module), a motion or device orientation sensor (e.g., an accelerometer, digital compass, or gyro), temperature sensor, imaging sensor (e.g., photo or video), biometric sensors (temperature, pulse rate, blood oxygen saturation, etc.), etc. Specific embodiments will be described with reference to location data and accelerometer data, though it will be apparent to a person skilled in the art that many different types of sensors may be used as alternatives or in addition to the types of sensors discussed herein.

As mentioned, the data provider 16 may be a location aware module such as GPS unit or an accelerometer or may be any other appropriate data provider. In embodiments of the present disclosure, the smartphone 12 may be configured with a data responder 17 that is configured to provide enhanced data from the data provider 16 to nearby basic phones such as basic phone 20. The data responder 17 may be configured with a recent responses repository 18 and a privacy policy 19.

In the configuration of FIG. 3, an application 21 on the basic phone 20 may make a request for enhanced service data that is not normally available on the basic phone 20. For example, a basic phone without GPS, while in nearby contact with sufficient smartphones, can run an application (e.g., a mapping program) that synthesizes needed GPS data from sampling nearby smartphones. This enables a mapping application on the basic phone 20 that would normally be unavailable to its user.

The nearby phones can be dynamically identified, and the identity can last for the duration of proximity. In various embodiments, the identity can be anonymous meaning a nearby smartphone can generate a unique ID in replying to an incoming request for some data, and after sufficient time (of no follow up requests) it can delete and not reuse that ID. Such embodiments allow smartphones to share useful data (e.g., GPS, accelerometer, etc.) without giving the recipient too much information.

Figure 4:
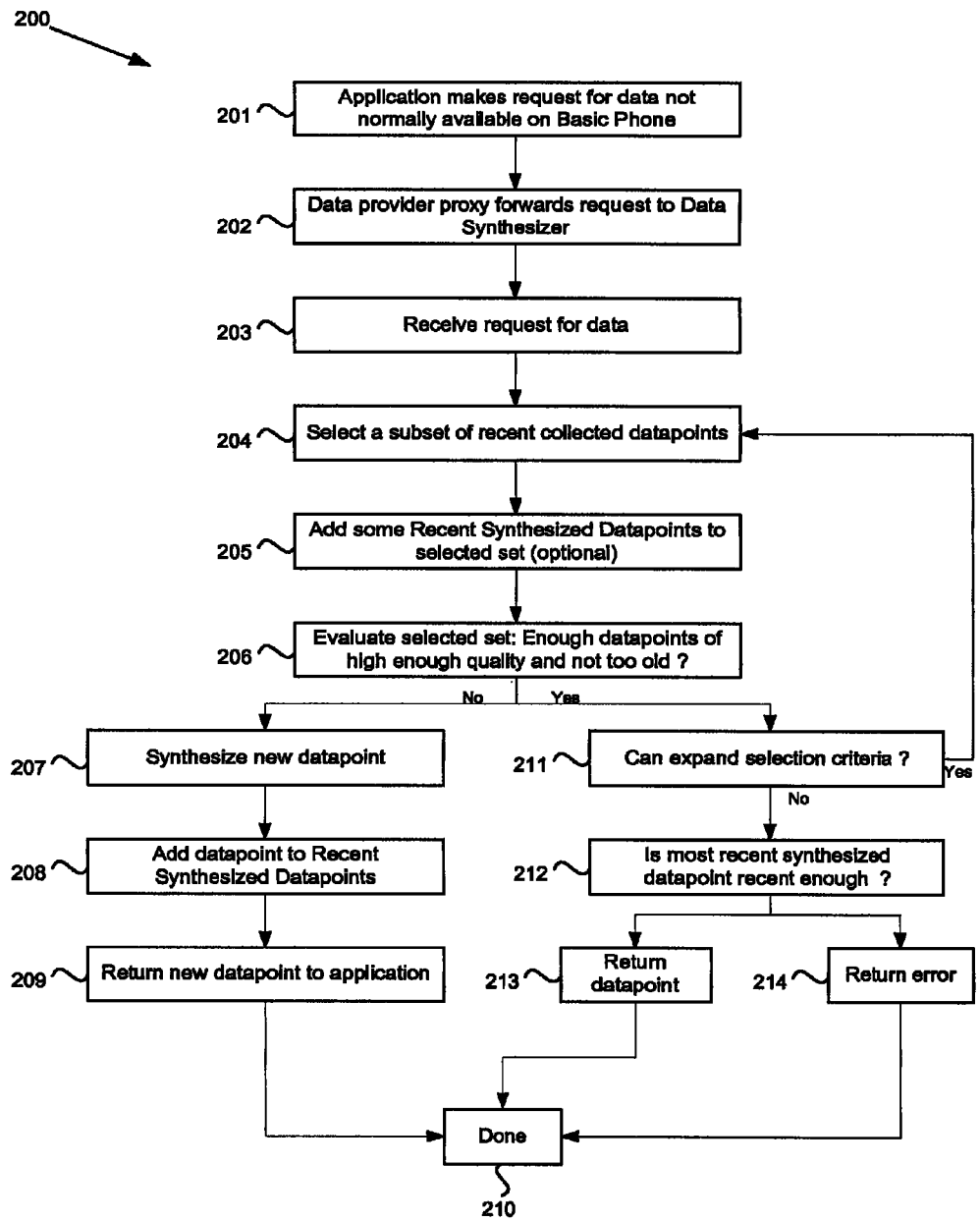
FIG. 4 shows a process for providing a datapoint to an application executing on a basic phone.

The data synthesizer 23 of the basic phone 20 collects, stores, and/or synthesizes datapoints for use by the various applications 21 of the basic phone 20. An example process for providing datapoints to the applications 21 of the basic phone 20 is shown in the flowchart 200 of FIG. 4. At step 201, an application 21 makes a request for enhanced data. Because the enhanced data is not available on the basic phone 20, the data provider proxy 22 forwards the request to the data synthesizer 23 (step 202). The data synthesizer 23 receives the request (step 203) and selects a subset of recent collected datapoints from the recent collected datapoints repository 25 (step 204). The selection of recent collected datapoints may be based on criteria such as how recent the datapoint is (e.g., determined from a timestamp), diversity of datapoints (collecting datapoints from multiple nearby devices), and properties of the datapoint itself (e.g., how near/far a GPS datapoint is relative to either i) datapoints in the selection set, or ii) previously synthesized datapoints, or a combination). At step 205, some recently synthesized datapoints may optionally be added to the selection from the recently synthesized datapoints repository 26. The data synthesizer then evaluates the selected set of datapoints (step 206) to determine if the quality of the datapoints is sufficiently high and not too old. If the evaluation of datapoints meets the requirements, then a new datapoint can be synthesized from the collected datapoints (step 207). For example, a new location datapoint can be calculated by average locations of location datapoints collected from nearby devices. A new accelerometer datapoint may be calculated by cloning the most recent accelerometer datapoint from the nearby device that has been in proximity to the basic phone the longest. The new datapoint is added to the repository of recently synthesized datapoints 26 (step 208) before returning the synthesized datapoint to the requesting application 21 via the data provider proxy 22 (step 209), after which the process terminates 210.

If at step 206, the evaluation of the selected datapoints does not meet the quality requirements, then an attempt may be made to expand the datapoint selection criteria (step 211). If the selection criteria is expanded, then the process returns to step 204 to generate a new selection of datapoints. Otherwise, if the most recently synthesized datapoint from the recently synthesized datapoints repository 26 is determined to be recent enough (step 212), then this datapoint may be returned to the application (step 213). If the most recent synthesized datapoint is too old, then the data synthesizer returns an error (step 214) which may be handled by the application 21 according to its programming.

Figure 5:
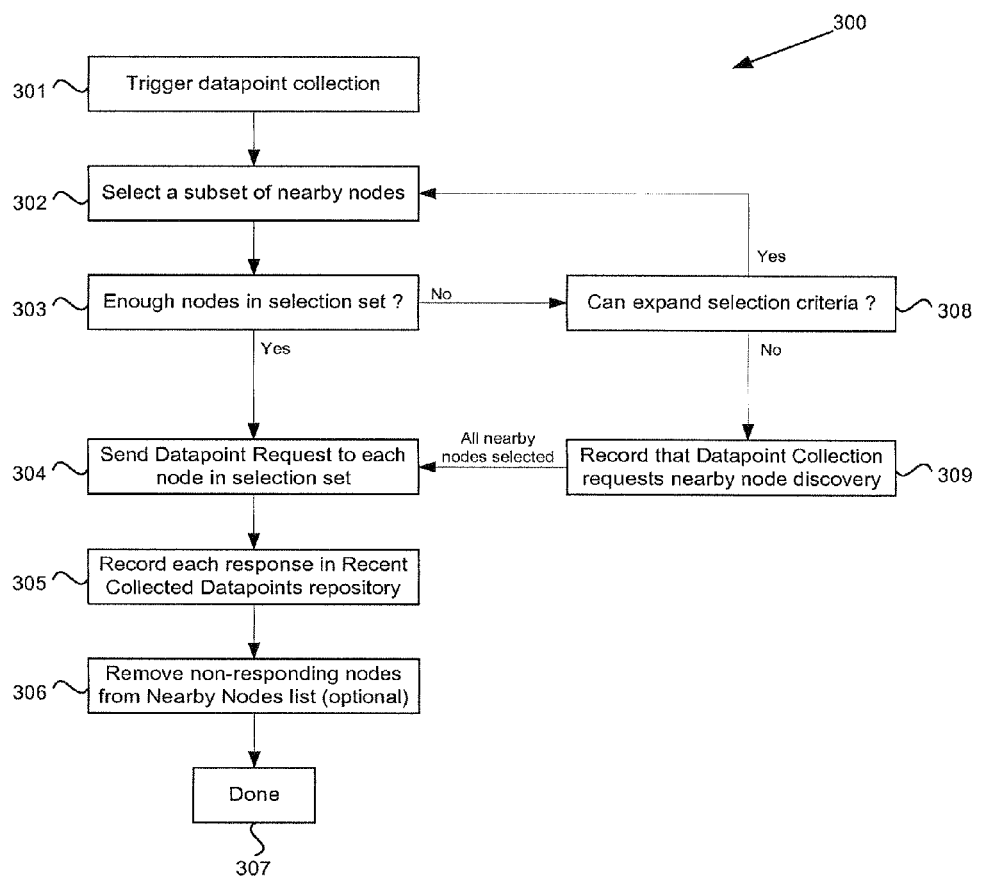
FIG. 5 shows process for collecting datapoints from nearby smart phones.

A process for collecting datapoints from nearby nodes is shown in the flowchart 300 of FIG. 5. At step 301, datapoint collection is triggered, e.g., based on a timeout, age of recent collected points, an application request, etc. The data synthesizer then selects nearby nodes (step 302) e.g., from the nearby nodes list 27. Criteria may be established to limit the number of nodes that are selected, such as the time of the most recent response from a node. The criteria may also bias to include previously responsive nodes in order to collect continuous coherent datapoint streams. Limiting the number of nodes prevents too many nodes from being contacted when only a few nodes may be needed to synthesize a datapoint.

If there are enough nodes in the selection set, as determined at step 303, then a Datapoint Request message is sent to each of the these nodes (step 304). An example of a Datapoint Request Message 60 is shown in FIG. 6. The Datapoint Request Message 60 includes a Basic Phone ID 61 i.e., of the requesting phone, a Request ID 62 and an indication of the requested datapoint type 63 such as a location datapoint, accelerometer data, etc. The data synthesizer 23 receives Datapoint Response Messages 70 (FIG. 7) in response to the Datapoint Request Messages 60, described in greater detail below, and at step 305, each datapoint that is received is recorded in the recent collected datapoints repository 25. Any non-responding nodes may optionally be removed from the nearby node list 27 at step 306 before the process terminates 307. If step 303 determines that there are insufficient nodes in the selected node set, then the selection criteria may be expanded (step 308) from the nearby node list 28 before re-selecting the nearby nodes. If no expansion of the node selection criteria is possible, then all nodes are selected and the data synthesizer 23 may record that a nearby node discovery process (described below) is required by the Data Collection processes in order to expand the available nodes (step 309) before proceeding to send the Datapoint Request Messages (step 304).

Figure 10:
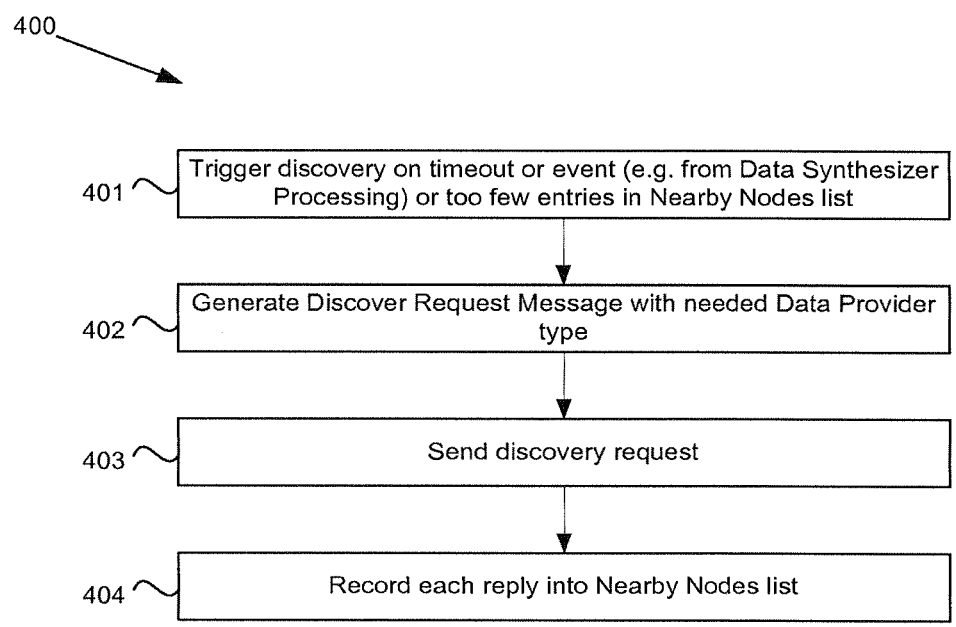
FIG. 10 shows a process for discovery nearby smartphones.

An example process for discovering nearby nodes will now be described with reference to the flowchart 400 of FIG. 10. At step 401, a node discovery process is triggered, such as by a timeout, event (e.g., from Data Synthesize Processing), or from too few nodes in the nearby node list 27. The data synthesizer 23 generates a Discovery Request Message, an example form 80 of which is shown in FIG. 8. The Discovery Request Message 80 includes a Basic Phone ID 81, a Request ID 82, Request Datapoint Provider Types field 83 and an Existing Datapoint Provider Types field 84. The node discovery request is configured to be non-routable to find smartphones that are only one hop away but the request may be broadcast, multicast, or unicast. The Discovery Request Message 80 may be sent over a local network type, such as Bluetooth, WiFi, ad hoc WiFi, WiFi Direct, etc., by the network access module 29.

The above described processes are generally described from the point of view of the basic phone 20. Processes from the smartphone view point will now be described.

Figure 11:
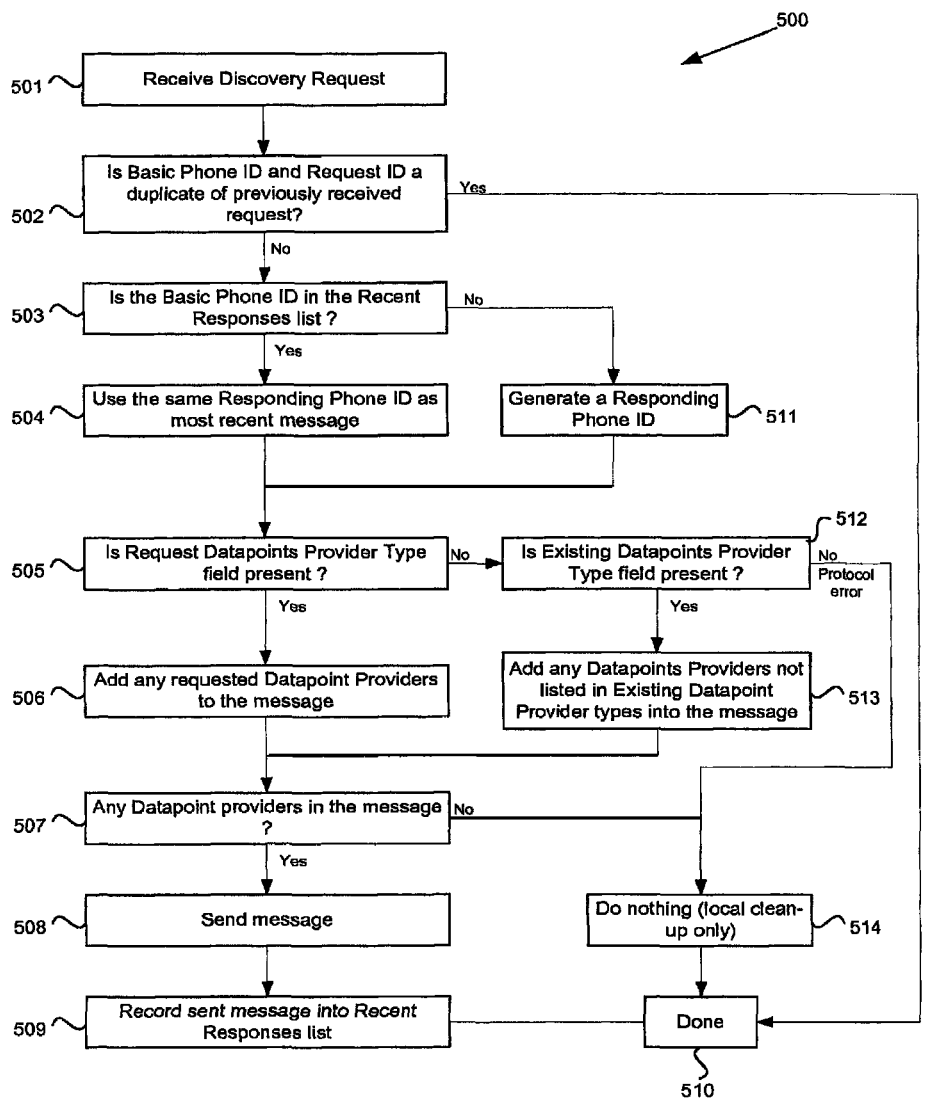
FIG. 11 shows a process for responding to a discovery request.

A process for responding to discovery requests by a smartphone will now be described with reference to the flowchart 500 of FIG. 11. A discovery request message 80 is received from a basic phone by a data responder 17 of a smartphone 12 at step 501. The data responder 17 reviews the Basic Phone ID 81 and Request ID 82 of the Discovery Request Message 80 and determines if these are a duplicate of a previously received request (step 502). If a duplicate scenario exists, then no action is taken and the process terminates (step 510). Otherwise, the data responder 17 proceeds to review the recent responses list 18 and if the Basic Phone ID 81 of the request message 80 is in the list 18 (step 503), then the same Responding Phone ID is re-used (step 504) in a response message 90 (FIG. 9). If the Basic Phone ID is not present, the data responder 17 generates a new Responding Phone ID (step 511) and adds this ID to the Responding Phone ID field 92 of the Discovery Response Message 90. The data responder 17 then determines if the Request Message 80 contains a Request Datapoints Provider Type field 83 (step 505). This field denotes what particular datapoint types the basic phone is asking for (e.g., location type data (GPS or similar), accelerometer type data, etc. The data responder 17 adds any requested datapoint providers to the field 93 of the Discovery Response Message 90 at step 506. If the Discovery Response Message 90 is not empty, i.e., now contains any Datapoint Providers (step 507), the message 90 is sent to the basic phone (step 508) and the sent message is recorded into the recent responses list 18 (step 509) before the process completes (step 510). If no Datapoint Providers have been added at step 507, then the data responder 17 takes no further action other than local clean-up (step 514) before the process completes (step 510).

If the data responder 17 determines at step 505 that the Discovery Response Message 90 does not contain a relevant Request Datapoints Provider Type field 83 or an Existing Datapoints Provider Type field 84 then no further action is taken (step 514). The Existing Datapoints Provider Type 84 is a field that allows an alternative protocol where the basic phone sends out this field which tells the nearby smartphones what data sensors the basic phone already has (e.g., location (GPS or similar), accelerometer, etc.). The smartphone is then expected to reply if it has "any other sensor type" that the basic phone does not have. This allows for future sensor types not anticipated at this time to appear on smartphone devices and be incorporated into new applications on basic phones without changing the protocol. Thus, if an Existing Datapoints Provider Type field 84 is indicated then any Datapoints Provider Types not already listed in the Existing Datapoint Provider Types 84 (i.e., sensor types that the smartphone has over and above what the basic phone indicated it has in the Existing Datapoint Provider Types 84) are added (step 513) and the process continues to step 507 described above.

Figure 12:
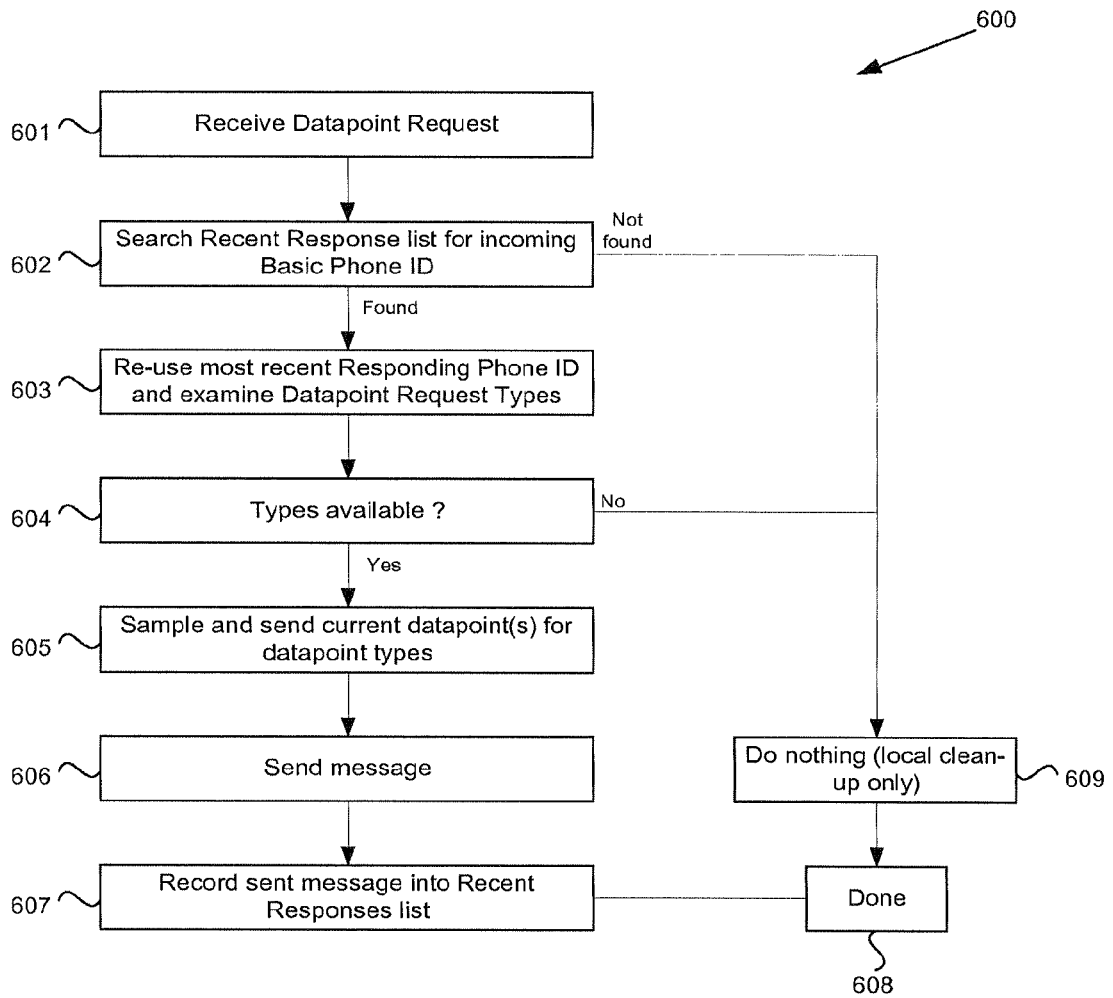
FIG. 12 shows a process for responding to a datapoint request.

A process undertaken by a smartphone or other enhanced services device for responding to datapoint requests will now be described with reference to the flowchart 600 of FIG. 12. At step 601, a data responder 17 of a smartphone 12 receives a Datapoint Request Message 60 from a basic phone 20. The data responder 17 searches the recent response list 18 for the Basic Phone ID 61 indicated in the request message 60. If the Basic Phone ID is not found, then no further action is taken (step 609). This represents the case of a nearby smartphone receiving a broadcast/multicast datapoint request where either the smartphone was not discovered yet or the smartphone was discovered and through a long enough inactivity the recent requests dropped out of the smartphone's list. Checking the recent response list and taking no further action if the Basic Phone ID is not found prevents all smartphones receiving and responding to a broadcast/multicast request if only a few datapoints are needed. Not shown in the process 600 is an optional check for duplicate requests which may be similar to the duplicate check described in relation to the Discovery Response process 500 described with reference to FIG. 11.

If the Basic Phone ID is identified in the recent response list 18, then the data responder 17 generates a Datapoint Response Message 70 (FIG. 7) which includes a Request ID 71 the same as indicated in field 62 of the Datapoint Request Message 60 and the same Responding Phone ID 72 as indicated in the recent response list 18. If no datapoints for the datapoint types indicated at field 63 in the request 60 are available, as determined at step 604, then no further action occurs (step 609). If datapoints are available for the requested type(s), then datapoints are sampled and added to the Datapoint Response Message 70 (step 605) as per type fields 73, 74, etc. The datapoints added may be a single datapoint (per type) or a list of recent datapoints (per type) if the data responder 17 periodically samples data for types and retains the most recent datapoints. When the Data Response Message 70 has been completed, it is sent to the basic phone 20 (step 606) and recorded in the recent responses list 18 (step 607) before the process terminates (step 608).

The Datapoint Request Messages 60 and Discovery Request Messages 80 pass from the data synthesizer module 23 of a basic phone 20 to the data provider 17 of an enhanced services device 12 via the network access module 29. The Datapoint Response Messages 70 and Discovery Response Messages 90 pass in the return direction. These messages may be designed for either unicast phone-to-phone, multicast, or broadcast. When a request is broadcast or multicast, the discovery response process 500 and the datapoint response process 600 described separately above may be combined into a single process. In such cases, the broadcast/multicast request may act as an implicit discovery request.

Figure 13:
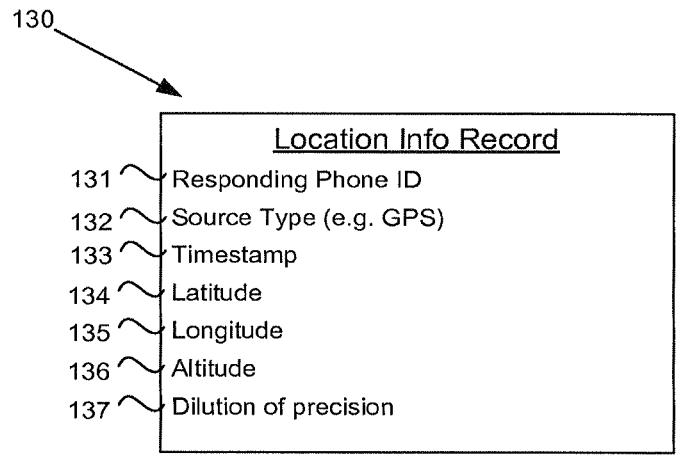
FIG. 13 shows an example form of a location information record.
Figure 14:
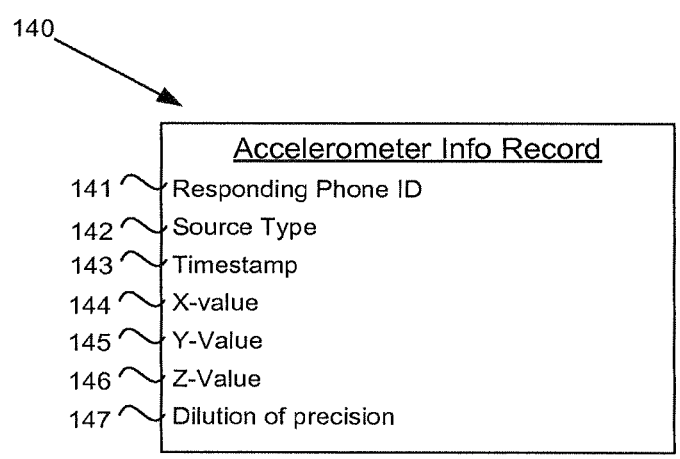
FIG. 14 shows an example form of an accelerometer information record.

Examples of datapoints conveyed in the Datapoint Response Messages 70 are shown in FIGS. 13 and 14. A location information record 130 may convey location datapoints and may include fields for a Responding Phone ID 131, Source Type (e.g., GPS) 132, timestamp 133, latitude 134, longitude 135, altitude 136, and dilution of precision 137. The dilution of precision 137 is a numerical value which increases in relation to the possible error in the accuracy of the data values. This value may result from: i) sensor data type provider "internal" information (e.g., for a Location Info Record the value may correspond to the GPS "dilution of precision (DOP)" value which is derived from GPS data samples and based in part on the geometric orientation of the GPS satellites providing data for the sample) or ii) the Data Responder 17 may generate this value due to an applicable Privacy Policy 19 (e.g., a GPS equipped smartphone that has a privacy policy to not provide datapoints with accuracy <10 meters or having a GPS DOP value of <2) which causes the dilution of the sampled data values (e.g., for a Location Info Record the sampled data values for Latitude 134, Longitude 135, and/or Altitude 136 may be diluted by the Data Responder 17 due to an applicable Privacy Policy 19 and a dilution of precision 137 value may be provided) or iii) both (in the case where the underlying sensor data type provides a dilution measure and the Data Responder adds additional error to the data values due to an applicable Privacy Policy then the Data Responder may generate a dilution of precision value based on both). Similarly, an accelerometer information record 140 (FIG. 14) may include fields for a Responding Phone ID 141, source type 142, timestamp 143, x-value 144, y-value 145, z-value 146, and dilution of precision 147. The amount of dilution introduced by the Privacy Policy 19 may depend on the authenticated identity of the basic phone, i.e., if the basic phone provides an authenticated identity previously registered with the smartphone, the smartphone's Privacy Policy 19 may introduce little or no dilution.

In alternative embodiments, the Data Provider Proxy 22 and the Data Synthesizer module 23 may be embedded in each application 21. While this may not be optimal under some circumstances, it does not require a separate installation of these modules on the phone operating system and so can be deployed with the application as a common implementation.

In alternative embodiments, the sample data may be sent to a server (or a nearby smartphone) to compute the synthetic data point(s).

Examples of applications that may utilize the above described functionalities include an exercise application that requires an accelerometer. The exercise application can operate on a basic phone while its user is jogging near another jogger who has a smartphone. Accelerometer data can be transferred from the smartphone to the basic phone to allow the exercise application to execute. A further example is a mapping application which can operate on a basic phone with high accuracy based on nearby GPS equipped smartphones (GPS or similar location service). A further example is a race assistant application operating on a basic phone and displaying to a race participant weather data (temperature, wind, precipitation rates) and route status (dry vs. wet vs. icy surface condition, route blockages, competitor positions) where the smartphones carried by support team members gather data points from their position, acceleration, image, weather, and video sensors.

Other types of sensor data that can be transferred from an enhanced services phone to a basic phone includes audio to record an event (e.g., concert/lecture) or to sample the background noise to classify the environment, photo or video (e.g., where a basic phone does not have a camera functionality but instead receives photo or video data from an enhanced services phone), digital compass, temperature, ambient light infrared sensor, and network level IDs that can be (e.g., a basic phone without WiFi can use the WiFi of nearby smartphones to enable an application that provides mapping based on the WiFi signals, e.g., network SIDs heard).

Enabling all phones to sample nearby data (e.g., sensor data on nearby smartphones) enables only a small number of smartphones to provide their capabilities to a large group.

In addition to providing new capabilities and advanced applications to users of basic phones, certain applications can also benefit from the above described embodiments by gaining additional participants. For example, an application for reporting long lines at a traffic light or checkout lines at a shopping mall would benefit by achieving a greater density of devices participating in the application which would enable increased accuracy of wait time estimates. Specifically if 10 people are in line but only 3 have smartphones with location information the wait time estimate will be calculated based on these 3 people. If however, the 7 other phones acquire the location capability of nearby smartphones then all 10 queue members can be included and the wait time estimate will be more accurate. This application that performs wait time estimates can thus execute on both smartphones and basic phones.

It can be seen from the above described examples that advanced applications can be improved without waiting for basic phones to be replaced by smartphones. Users of basic phones can receive benefits from nearby smartphone users.

The applications 21 that execute on the basic phone 20 may or may not be aware of the data capabilities of the basic phone 20. The data provider proxy may be configured to handle data requests and for some applications, may retrieve data from local data sensors and for other applications, may retrieve data through the data synthesizer 23 using the methods described above.

The components of the system 10 may be embodied in hardware, software, firmware, or a combination of hardware, software, and/or firmware. For example, the applications 21 may be provided as computer executable instructions that can be stored in a memory of the basic phone 20, such as a read only memory (ROM) or flash memory. The basic phone will typically include at least one processor for performing the functions of the basic phone 20. Such a processor may also execute the software instructions to perform the functions of the applications. Similarly, the basic phone may be provided with software that can provide the functions of the data provider proxy 22 and data synthesizer 23.

In a similar manner, a phone having enhanced services such as the smartphone 12 of FIG. 3 will typically include at least one processor and may store executable instructions for providing the functionality of the data responder 17.

While the basic phone 20 is described herein as having minimal functionality and as retrieving enhanced services data from nearby smartphones, the basic phone 20 could also be a smartphone that provides some enhanced data services to its user using data locally generated within the basic phone by its own sensors. However, the smartphone may not be configured with certain sensors and thus may generate datapoints for particular applications from other nearby smartphones that have the required sensors. An example is the iPhone 3G lacking the digital compass sensor, which may utilize digital compass data from nearby iPhone 3GS devices. In this scenario the iPhone 3G is in the role of a "basic phone" in relation to the iPhone 3GS phones which fulfill the role of "smartphones" by providing a missing capability, even though both devices are commonly called smartphones.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors, or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

The invention claimed is:

1. A method, comprising:
   generating data at an enhanced communications device in response to sensing an event using at least one sensor;
   receiving a data request comprising an identification of a mobile device, an identification of data not capable of being generated at the mobile device, and an identification of the data request from the mobile device at the enhanced communications device;
   determining the data request is a duplicate data request in response to the identification of the mobile device or the identification of the data request;
   identifying the enhanced communications device to the mobile device in response to recognizing the identification of the mobile device in a recent responses list; and
   providing a discovery reply comprising the data and an identification of the least one sensor that generated the data in the enhanced communications device in response to the data request.

2. The method of claim 1, further comprising storing the data in a memory.

3. The method of claim 1, further comprising recording the data provided to the mobile device in a memory.

4. The method of claim 1, wherein the sensing the event comprises using at least one of a global position system module or an accelerometer.

5. The method of claim 1, further comprising introducing an error in the data by applying a privacy policy.

6. An enhanced communications device, comprising:
   at least one data sensor configured to generate data in response to sensing an event; and
   a data responder configured to:
     receive, from a mobile device, a request comprising an identification of the mobile device, an identification of data being requested by the mobile device that is not capable of being generated by the mobile device, and an identification of the request;
     determine the request is a duplicate request in response to the identification of the mobile device or the identification of the request;
     identify the enhanced communications device to the mobile device in response to recognizing the identification of the mobile device in a recent responses list; and
     transmit a reply including the data and an identification of the least one sensor that generated the data in the enhanced communications device in response to the request.

7. The enhanced communications device of claim 6, wherein the data responder is further configured to store the data in a memory.

8. The enhanced communications device of claim 6, wherein the data responder is further configured to:
   record the data provided to the mobile device in a memory.

9. The enhanced communications device of claim 6, wherein the at least one data sensor further comprises at least one of a global position system module or an accelerometer.

10. The enhanced communications device of claim 6, wherein the data responder is further configured to:
    introduce an error in the data by applying a privacy policy.

11. An enhanced communications device, comprising:
    means for generating data at the enhanced communications device in response to sensing an event using at least one sensor;
    means for receiving, at the enhanced communications device, a data request comprising an identification of a mobile device sending the request, an identification of data that is not capable of being generated by the mobile device, and an identification of the data request from the mobile device;
    means for determining the data request is a duplicate data request in response to the identification of the mobile device or the identification of the data request;
    means for identifying the enhanced communications device to the mobile device in response to recognizing the identification of the mobile device in a recent responses list; and
    means for providing a reply including the data and an identification of the least one sensor that generated the data in the enhanced communications device in response to the data request.

12. The enhanced communications device of claim 11, further comprising means for storing the data in a memory.

13. The enhanced communications device of claim 11, further comprising means for recording the data provided to the mobile device in a memory means.

14. The enhanced communications device of claim 11, wherein the means for sensing the event comprises means for using at least one of a global position system module or an accelerometer.

15. The enhanced communications device of claim 11, further comprising means for introducing an error in the data by applying a privacy policy.

16. An article of manufacture comprising a memory device having stored thereon computer executable instructions that, when executed by a processing device, configure the processing device to:
    generate data at an enhanced communications device in response to sensing an event using at least one sensor;
    receive, at the enhanced communications device, a data request comprising an identification of a mobile device sending the request, an identification of data that is not capable of being generated by the mobile device, and an identification of the data request from the mobile device;
    identify the enhanced communications device to the mobile device in response to recognizing the identification of the mobile device in a recent responses list; and
    provide the data and an identification of the least one sensor that generated the data in the enhanced communications device to the mobile device in response to the data request.

17. The article of claim 16, further configuring the processing device to store the data in a memory.

18. The article of claim 16, further configuring the processing device to determine the data request is a duplicate data request in response to the identification of the mobile device or the identification of the request.

19. The article of claim 16, further configuring the processing device to record the data provided to the mobile device in a memory.

20. The article of claim 16, further configuring the processing device to sense the event using at least one of a global position system module or an accelerometer.

21. The article of claim 16, further configuring the processing device to introduce an error in the data by applying a privacy policy.

* * * * *